United States Patent
Burgel et al.

(10) Patent No.: US 7,198,269 B2
(45) Date of Patent: Apr. 3, 2007

(54) CONVERTIBLE SINGLE-TURN TO MULTI-TURN GAMING STEERING WHEEL

(75) Inventors: Thomas Burgel, Newark, CA (US);
Keith Klumb, Fremont, CA (US);
David McVicar, El Dorado, CA (US);
Aidan Kehoe, Fremont, CA (US);
Christophe Juncker, Fremont, CA (US); David Wegmuller, Union City, CA (US)

(73) Assignee: Logitech Europe S.A., Romanel-sur Morges (CH)

( * ) Notice: Subject to any disclaimer, the term of this patent is extended or adjusted under 35 U.S.C. 154(b) by 814 days.

(21) Appl. No.: 10/434,764

(22) Filed: May 8, 2003

(65) Prior Publication Data

US 2004/0224766 A1  Nov. 11, 2004

(51) Int. Cl.
*A63F 13/02* (2006.01)
*A63F 9/24* (2006.01)

(52) U.S. Cl. .................. 273/148 R; 463/38; 463/7

(58) Field of Classification Search ............ None
See application file for complete search history.

(56) References Cited

FOREIGN PATENT DOCUMENTS

| FR | 2809522 A | 11/2001 |
|----|-----------|---------|
| JP | 3077577 A | 4/1991 |
| JP | 8323041 A | 12/1996 |

*Primary Examiner*—Mark Sager
(74) *Attorney, Agent, or Firm*—Townsend and Townsend and Crew LLP

(57) ABSTRACT

Embodiments of the present invention are directed to systems and methods for operating a gaming wheel system including a steering wheel which may be a single-turn wheel (at most 360° lock-to-lock) or a multi-turn wheel (more than 360° lock-to-lock) to play a game which may be designed for a single-turn wheel (a legacy game) or a multi-turn wheel (a native game, irrespective of whether it takes advantage of the multi-turn capability or not). The system is configured to operate the gaming wheel system in one of four states. The first state is the single-turn, legacy mode state for operating either a single-turn wheel or a multi-turn wheel in the single-turn mode to play a legacy game. The second state is the multi-turn, legacy mode state for operating a multi-turn wheel in the multi-turn mode to play a legacy game. The third state is the single-turn, native mode state for operating either a single-turn wheel or a multi-turn wheel in the single-turn mode to play a native game. The fourth state is the multi-turn, native mode state for operating a multi-turn wheel in the multi-turn mode to play a native game.

27 Claims, 7 Drawing Sheets

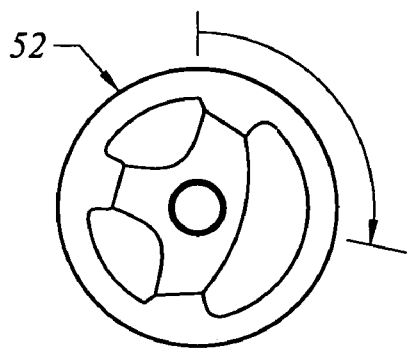
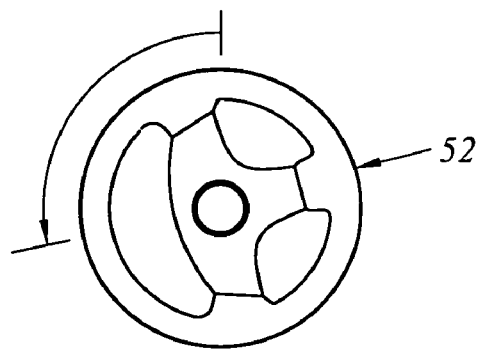
FIG. 7   FIG. 8
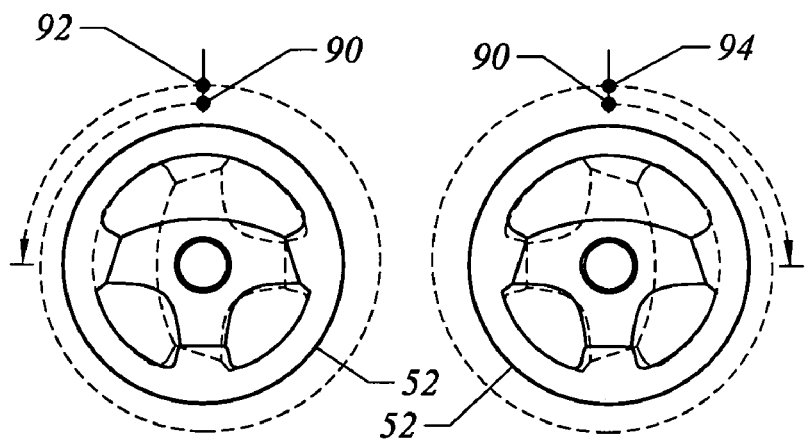
FIG. 9
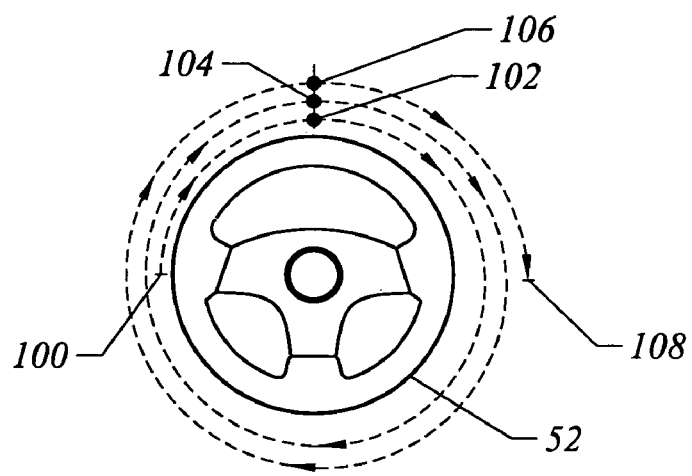
FIG. 10

CONVERTIBLE SINGLE-TURN TO MULTI-TURN GAMING STEERING WHEEL

CROSS-REFERENCES TO RELATED APPLICATIONS

Not Applicable

BACKGROUND OF THE INVENTION

The present invention relates to gaming devices and, more particularly, to a gaming steering wheel convertible between single-turn and multi-turn modes of operation.

Heretofore, gaming steering wheels for PC/Console gaming or the like are limited in operation to rotational angles much less than 360 degrees in both clockwise and counter-clockwise directions combined. A rotational range of within 360° limits the steering wheel to a single turn. It is advantageous to provide a multi-turn steering wheel operable beyond the 360° limit. Limitations of previous steering wheels to a single-turn mode of operation are mechanical, electrical, electromechanical, software/firmware, and game design in nature.

BRIEF SUMMARY OF THE INVENTION

Embodiments of the present invention are directed to systems and methods for operating a gaming wheel system including a steering wheel which may be a single-turn wheel or a multi-turn wheel to play a game which may be designed for a single-turn wheel, unaware of a multi-turn wheel (a legacy game) or a multi-turn wheel (a native game, whether it takes advantage of the multi-turn capability or not). The system is configured to operate the gaming wheel system in one of four states. The first state is the single-turn, legacy mode state for operating either a single-turn wheel or a multi-turn wheel in the single-turn mode to play a legacy game designed for a single-turn wheel. The second state is the multi-turn, legacy mode state for operating a multi-turn wheel in the multi-turn mode to play a legacy game. The third state is the single-turn, native mode state for operating either a single-turn wheel or a multi-turn wheel in the single-turn mode to play a native game in single-turn mode. The fourth state is the multi-turn, native mode state for operating a multi-turn wheel in the multi-turn mode to play a native game. A "legacy game" is a game which was written with previous software/driver code that is unaware of the multi-turn capabilities of a wheel. A "native game" is a game which was written with a software/driver combination that is aware of a multi-turn wheel. "Native Game" does not imply "must use multi-turn".

In accordance with an aspect of the present invention, a multi-turn gaming wheel system comprises a steering wheel rotatable from a centered position in a counter-clockwise direction for over 180° and in a clockwise direction for over 180° to provide more than 360° lock-to-lock. A single-turn stop is movable between a single-turn mode position and a multi-turn mode position. The single-turn stop limits the steering wheel to rotation from the centered position of at most 180° in the counter-clockwise direction and at most 180° in the clockwise direction to provide at most 360° lock-to-lock in the single-turn mode. The single-turn stop does not limit the steering wheel in rotation in the multi-turn mode position. An operating mode module is configured to communicate with a host system and to set an operating mode for the steering wheel to be in a legacy mode to provide input to the host system for playing a legacy game designed for a single-turn wheel capable of at most 360° lock-to-lock, or in a native mode to provide input to the host system for playing a native game designed for a multi-turn wheel capable of more than 360° lock-to-lock.

In some embodiments, a start-up module is configured to select the single-turn mode and the legacy mode during start-up of the multi-turn gaming wheel system. A manual override module is operable by a user manually to select between the single-turn mode and the multi-turn mode for the steering wheel, wherein the single-turn stop is moved to the single-turn mode position upon selection of the single-turn mode of the manual override module and to the multi-turn mode position upon selection of the multi-turn mode of the manual override module. The single-turn stop is in the single-turn mode position upon start-up, and is moved to the multi-turn mode position upon selection of the multi-turn mode of the manual override module. A centering module is configured to count a number of angular centers of the steering wheel lock-to-lock and determine a center position of the steering wheel, wherein each angular center represents a revolution of rotation of the steering wheel. A center position encoder is configured to detect and register a center for the steering wheel for each revolution of rotation of the steering wheel. A rotational encoder is configured to detect a rotation and a direction of rotation of the steering wheel.

In specific embodiments, a sensor is operatively coupled with the steering wheel to detect a rotational position of the steering wheel with respect of the centered position. The sensor coupled with the steering wheel by a gear reduction system to rotate by less than 360°. The sensor may comprise a rotational potentiometer or a linear potentiometer operatively coupled with the steering wheel.

In accordance with another aspect of the invention, a system for playing a game using a steering wheel comprises a gaming wheel system. The gaming wheel system includes a steering wheel rotatable from a centered position in a counter-clockwise direction and in a clockwise direction to provide a rotational range lock-to-lock; and a memory comprising a wheel identifier in a first location identifying the steering wheel as a single-turn wheel or a multiple turn wheel. The single-turn wheel is rotatable from the centered position of at most 180° in the counter-clockwise direction and at most 180° in the clockwise direction to provide at most 360° lock-to-lock. The multi-turn wheel is rotatable from the centered position in a counter-clockwise direction for over 180° and in a clockwise direction for over 180° to provide more than 360° lock-to-lock. A host system includes a multi-turn aware driver configured to communicate with the gaming wheel system to receive the wheel identifier identifying the steering wheel and to set the steering wheel to operate in the single-turn mode or the multi-turn mode. The single-turn stop is moved to the single-turn mode position upon setting the steering wheel in the single-turn mode and to the multi-turn mode position upon setting the steering wheel in the multi-turn mode.

In some embodiments, the gaming wheel system is in the single-turn mode upon start-up, and is transitioned to the multi-turn mode upon receiving communication from the multi-turn aware driver of the host system to set the steering wheel in the multi-turn mode. The host system is configured to play a game which is either a legacy game designed for a single-turn wheel capable of at most 360° lock-to-lock, or a native game designed for a multi-turn wheel capable of more than 360° lock-to-lock. The host system communicates with the gaming wheel system to leave the steering wheel to operate in a legacy mode if the game is a legacy game or set a native mode if the game is a native game. The memory of the gaming wheel system includes a device descriptor in a second location describing features of the gaming wheel system, and the host system is configured to communicate with the gaming wheel system to receive the device descriptor and set up game play conditions based on the device descriptor.

In accordance with another aspect of the present invention, a method of operating a gaming steering wheel comprises providing a gaming wheel system. The gaming wheel system includes a steering wheel rotatable from a centered position in a counter-clockwise direction and in a clockwise direction to provide a rotational range lock-to-lock; and a memory comprising a wheel identifier in a first location identifying the steering wheel as a single-turn wheel or a multiple turn wheel. The single-turn wheel is rotatable from the centered position of at most 180° in the counter-clockwise direction and at most 180° in the clockwise direction to provide at most 360° lock-to-lock. The multi-turn wheel is rotatable from the centered position in a counter-clockwise direction for over 180° and in a clockwise direction for over 180° to provide more than 360° lock-to-lock. The method further comprises rotating the steering wheel in a counter-clockwise direction or a clockwise direction and counting a number of revolutions with each revolution indicating passing a center, until the steering wheel hits a stop or until the number of centers matches a preset maximum number, and if the steering wheel hits the stop before the number of centers matches the preset maximum number then rotating the steering wheel in an opposite direction and counting a number of revolutions until the steering wheel hits a stop or until the number of centers matches the preset maximum number. The steering wheel is a single-turn wheel if the number of centers equals to one and the steering wheel is a multi-turn wheel if the number of centers equals to more than one. The steering wheel system is set in a single-turn mode during start-up.

In some embodiments, the steering wheel system is changed from the single-turn mode to the multi-turn mode after start-up if the number of centers is greater than one. The method may include setting an operating mode of the gaming wheel system during start-up to a legacy mode to provide input to a host system for playing a legacy game designed for a single-turn wheel capable of at most 360° lock-to-lock. The operating mode of the gaming wheel system is changed after start-up to a native mode to provide input to the host system for playing a native game designed for a multi-turn wheel capable of more than 360° lock-to-lock. The operating mode is changed by communicating a command from the host system to the gaming wheel system for playing the native game.

BRIEF DESCRIPTION OF THE DRAWINGS

FIG. 7 is a schematic view of the multi-turn steering wheel rotating in the clockwise direction during a start-up procedure according to an embodiment of the invention.

FIG. 8 is a schematic view of the multi-turn steering wheel rotating in the counter-clockwise direction during a start-up procedure according to an embodiment of the invention.

FIG. 9 is a schematic view of the multi-turn steering wheel illustrating the detection of the number of centers according to one embodiment of the invention.

FIG. 10 is a schematic view of the multi-turn steering wheel illustrating the detection of the number of centers according to another embodiment of the invention.

DETAILED DESCRIPTION OF THE INVENTION

The operation of a multi-turn steering wheel from a software/firmware point of view is complex in nature (hereinafter software and firmware are used interchangeably for convenience and such use is not intended to limit the scope to only one and exclude the other). There are a number of constraints that need to be taken into account. The software/firmware preferably is compatible with older games, including those that were not written with any features of built-in future proofing, operates properly with new games not written for multi-turn steering wheels as well as new games written for multi-turn steering wheels, and provides seamless operation for the different types of games and modes of operation so as to prevent user confusion.

These desired features dictate a firmware path with dual personalities. That is, the steering wheel can appear as a clone of a previous, single-turn wheel or it can appear as a true multi-turn wheel. One of the key features of a steering wheel having the multi-turn and single-turn wheel capabilities is that the wheel is under software control. This is important to make a driving game enjoyable and realistic. For a gaming steering wheel to behave in a realistic manner, it should mimic as closely as possible a real car's steering.

Figure 1:
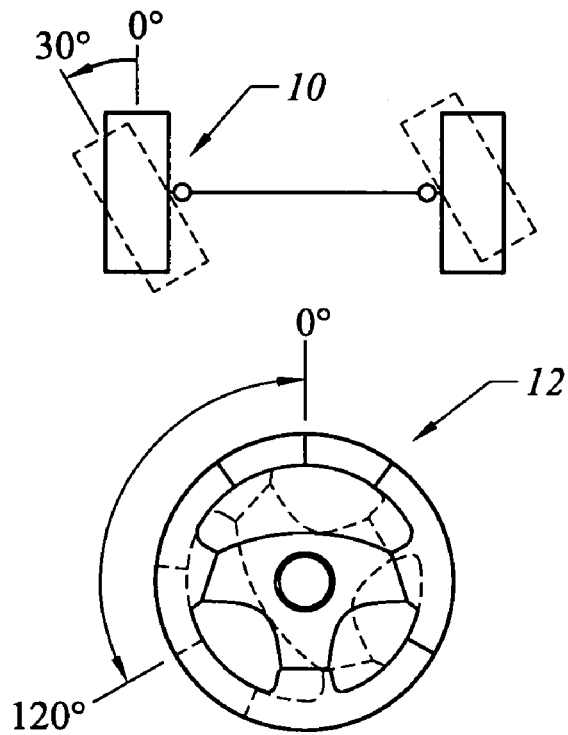
FIG. 1 is a schematic view of a single-turn steering wheel.

Single-turn gaming wheels (also referred to as legacy wheels) have a very different behavior from real steering wheels or multi-turn gaming wheels, in that they are limited to total rotational angles of at most 360°. If the total angle through which the car's front wheels can rotate is 60°, as illustrated in FIG. 1, and the total angle through which the gaming steering wheel 12 can rotate is 240°, then the steering ratio is 4:1. That is, the steering wheel rotates four degrees for each one degree the front wheels turn. Due to this very short steering ratio, the gaming wheel will feel highly sensitive which may make game play very difficult. Specifically, it may be difficult to drive in a straight line at higher speeds because there is a tendency to swerve back and forth as a result of the high sensitivity.

Figure 2:
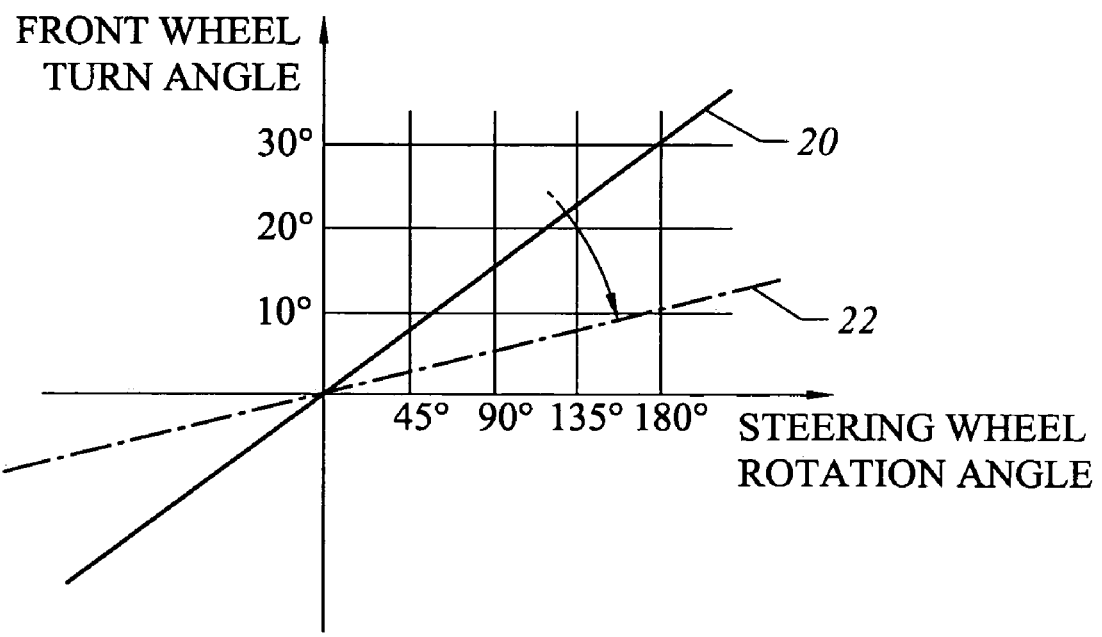
FIG. 2 is a plot of sensitivity curves for a single-turn steering wheel illustrating the effect of speed.

To overcome the restrictions imposed by the mechanically limited rotation of the gaming input device, game developers have used sensitivity curves to modify the game play. As shown in FIG. 2, a sensitivity curve defines the sensitivity of the wheel depending on the speed of the car. The curve 20 is plotted for a first speed, and the curve 22 is plotted for a second speed which is higher than the first speed. Sensitivity curves are typically used for game pads to make up for their low physical range. The result of applying a sensitivity curve is that at a higher speed, the car's wheels will physically turn less as compared to a car moving at a lower speed, as illustrated in FIG. 2. For example, the car's wheels may turn 60° lock-to-lock at a low speed but only 10° lock-to-lock at a higher speed. If the car's wheels turn 10° lock-to-lock for a steering wheel that turns 120° lock-to-lock in a game device, then the steering ratio is 12 which corresponds almost to a real car's steering ratio.

Figure 3:
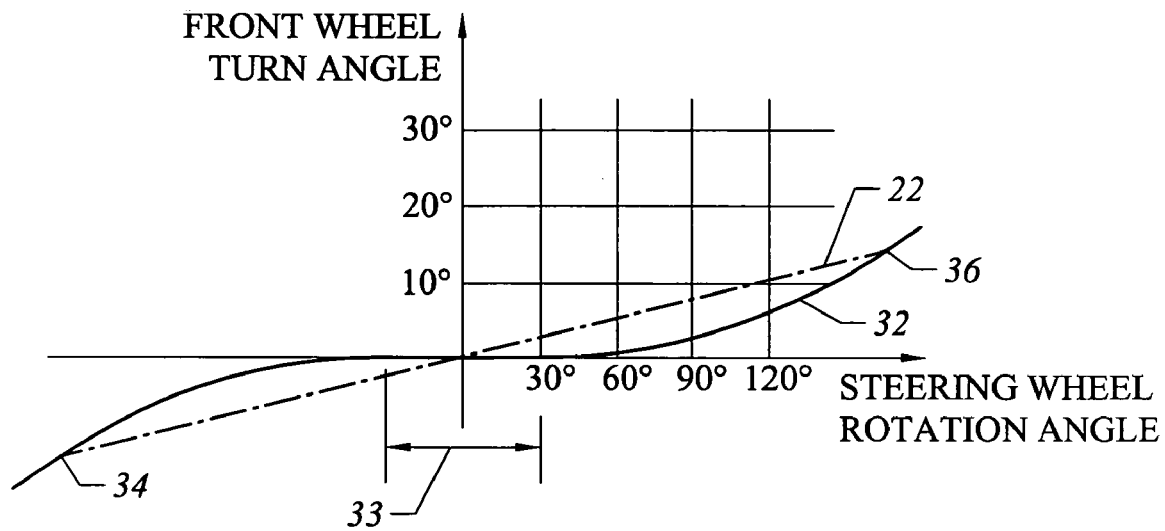
FIG. 3 is a plot of sensitivity curves for a single-turn wheel illustrating the effect of nonlinearity.

If a straight sensitivity curve has been implemented for a gaming wheel, adding nonlinearity to the sensitivity curve is generally not necessary. In some cases, however, the game play of the car may still feel somewhat unstable when driving at a high speed even after applying a straight sensitivity curve. Even at high speeds, the game may need more than 10° lock-to-lock for the car's wheels, or the car may be moving at a speed so high that even a normal steering ratio is not sufficient to eliminate the high sensitivity. On solution is to provide a nonlinear curve 32 for use instead of the straight curve 22, as shown in FIG. 3. The effect of the nonlinear curve 32 is that the gaming wheel will be less sensitive around the center position 33. At the two left and right locked positions 34, 36 where the two curves 22, 32 meet, the car's wheels will turn by the same degrees as those under the linear sensitivity curve 22. Therefore, the car will be more controllable under the nonlinear curve 32 and the game play will be improved.

A. Wheel Operating States

Figure 4:
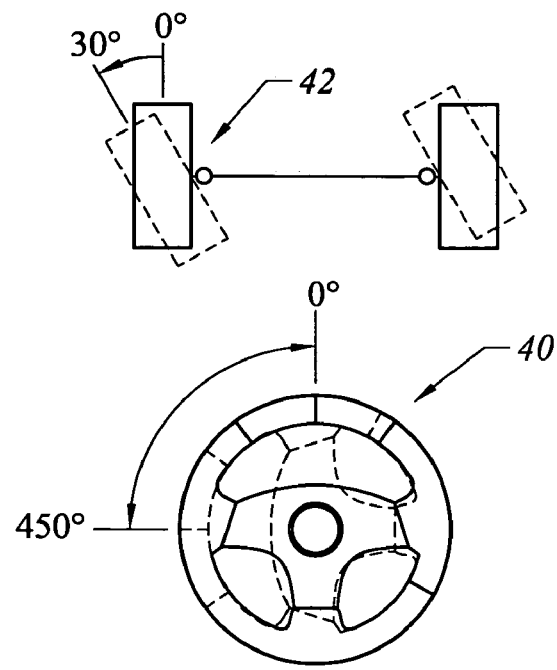
FIG. 4 is a schematic view of a multi-turn steering wheel according to an embodiment of the present invention.

The present invention provides multi-turn wheels with an angular range of more than 360°. For instance, a multi-turn wheel 40 as shown in FIG. 4 can rotate through angles in excess of 900° as in a real car. If the car's wheels 42 rotate through 60° while the gaming wheel rotates through 900°, then the steering ratio is 15:1, making it the same as an actual car. When using a multi-turn gaming wheel 40, the game developer's task of implementing a good steering response is drastically simplified. There is no more need to use sensitivity or nonlinear response curves. The implementation becomes as simple as linearly mapping the gaming wheel's position to the game's physics engine input values. This greatly reduces the risk of poor implementation for steering input. Because the multi-turn gaming wheel can turn as many degrees lock-to-lock as a real car, the over-sensitivity problem will not appear and the user experience will be much more realistic. An example of a multi-turn wheel is found in commonly assigned, co-pending U.S. patent application Ser. No. 10/434,763, entitled "Convertible Single-Turn to Multi-Turn Gaming Steering Wheel," filed on May 8, 2003, now U.S. Pat. No. 7,086,949 the entire disclosure of which is incorporated herein by reference.

In the exemplary embodiment, a two-position gaming steering wheel is capable of lock-to-lock rotations of greater than one revolution in the multi-turn mode, and is user/host-convertible to a single-turn mode of operation whereby the wheel is capable of at most one revolution in the single-turn mode. This allows for a steering wheel control device capable of being used on a standard PC/Console platform with games designed for single-turn operation of at most one revolution, as well as being convertible to a wheel capable of playing games designed for more than one revolution or playing legacy games (design for a single-turn wheel) games in multi-turn mode for more realism. The gaming wheel is designed to rotate, from its "centered" or "neutral" position, more than 180° clockwise and counter-clockwise. This is referred to as the multi-turn steering wheel's "native mode." For situations involving conversion to at most 180° in each direction, a single-turn stop is manually or electro-mechanically positioned to limit the rotation to at most one full turn. This is referred to as the steering wheel's "legacy mode." In this mode, the shaft of the gaming wheel is limited to a travel that results in at most one half revolution of the wheel in clockwise and counter-clockwise directions. An example of a single-turn stop is found in U.S. patent application Ser. No. 10/434,763, now U.S. Pat. No. 7,086,949, referenced above.

The multi-turn wheel has four distinct states of operation, which can be split into two "mode vectors" each having two modes. The two mode vectors are operating mode and turn mode. As shown in the mode matrix of FIG. 5, the operating modes are legacy mode and native mode, while the turn modes are single-turn mode and multi-turn mode. The wheel has four states of operation. The first state is the full legacy state in which the gaming wheel performs and behaves just like a previous single-turn wheel. The presence of this single-turn, legacy mode state ensures 100% compatibility with games that are written to make use of the single-turn wheel. The second state is the multi-turn, legacy mode state, in which the multi-turn capability allows the user to play a legacy game in multi-turn mode for added realism. The third state is the single-turn, native mode state; and the fourth state is the multi-turn, native mode state. The gaming wheel in these two native modes has extended resolution and additional controls.

The transition from one state to another state can occur by user override or by operation of the host system. The user may invoke a single-turn override or a multi-turn override. For single-turn override, the wheel will operate in either the single-turn, legacy mode state or the single-turn, native mode state. For multi-turn override, the wheel will operate in either the multi-turn, legacy mode state or the multi-turn, native mode state. The game will determine whether the wheel will operate in the legacy mode to play a legacy game or the native mode to play a native game.

Figure 6:
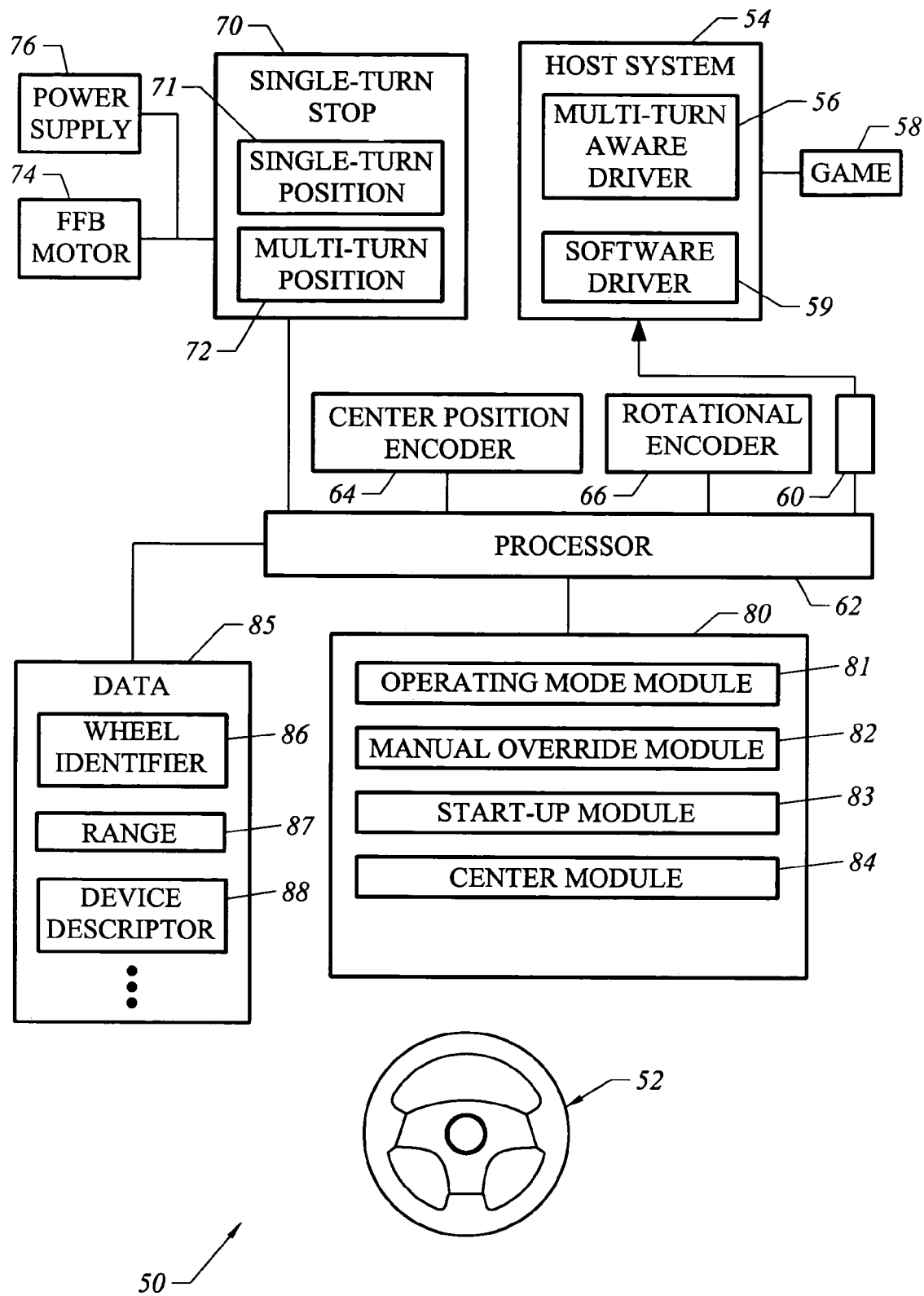
FIG. 6 is a schematic diagram of the multi-turn steering wheel system according to an embodiment of the present invention.
Figure 13:
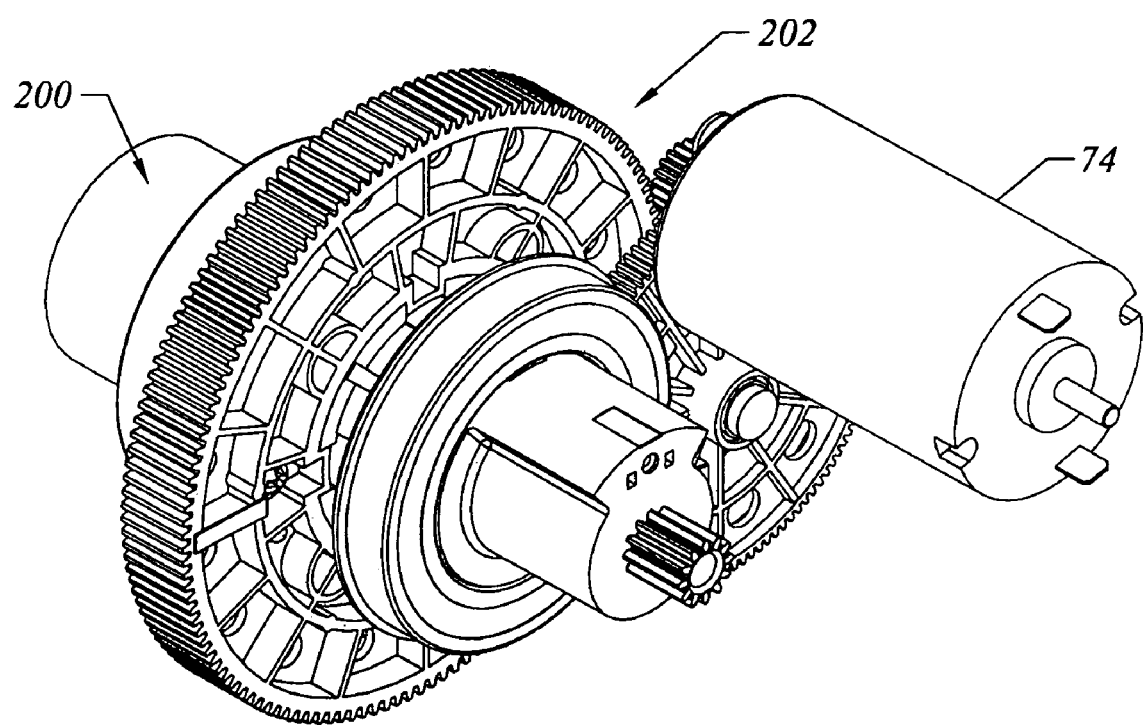
FIG. 13 is a perspective view of a force feedback motor coupled with the shaft of a steering wheel to provide force feedback according to an embodiment of the invention.

FIG. 6 shows an exemplary embodiment of the wheel system 50 for the wheel 52 configured to interface with the host system 54 which includes the multi-turn aware driver 56 and stores or provides access to the game 58. In addition to the multi-turn aware driver 56, a software driver 59 may be provided for communicating with the firmware of the wheel system 52. The wheel system 50 includes a connector which is typically a USB connector 60 for coupling with the host system 54. The wheel system 50 includes a microprocessor 62 coupled with a center position encoder 64 and a rotational encoder 66. The center position encoder 64 is a centering sensor which registers a "center" per revolution of the wheel 52 or until the wheel 52 hits a mechanical stop. The rotational encoder 66 is a relative positioning sensor for detecting the rotation and direction of the wheel 52. A single-turn stop 70 coupled with the processor 62 may be in single-turn position 71 or in multi-turn position 72. A force feedback (FFB) motor 74 is used to provide force feedback. One embodiment is illustrated in FIG. 13, in which the force feedback motor 74 is coupled with the shaft 200 of the steering wheel via a reduction gear system 202 to provide force feedback. An AC/DC power supply 76 supplies power to the single-turn stop 70 and the FFB motor 74. The AC/DC power supply 76 is typically an AC adaptor that converts AC to DC for the wheel.

As shown in FIG. 6, the firmware 80 of the wheel system 50 may include an operating mode module 81, a manual override module 82, a start-up module 83, and a centering module 84. The operating mode module 81 is configured to communicate with the host system 56 and to set an operating mode for the steering wheel 52 to be in a legacy mode to provide input to the host system 56 for playing a legacy game designed for a single-turn wheel, or in a native mode to provide input to the host system 56 for playing a native game designed for a multi-turn wheel. The manual override module 82 is operable by a user manually to select between the single-turn mode and the multi-turn mode for the steering wheel 52. The start-up module 83 is configured to select the single-turn mode and the legacy mode during start-up of the multi-turn gaming wheel system. The centering module 84 is configured to count a number of angular centers of the steering wheel 52 lock-to-lock and determine a center position of the steering wheel 52, wherein each angular center represents a revolution of rotation of the steering wheel 52. A memory 85 contains information regarding the wheel system 50 which can be accessed by the host system 56. For instance, the memory 85 may include a wheel identifier 86 identifying the steering wheel 52 as a single-turn wheel or a multi-turn wheel, an angular range 87 of the steering wheel 52, a device descriptor 88 describing the features and capabilities of the steering wheel 52, or the like. The device descriptor 88 may replace the wheel identifier 86. Of course, fewer of more modules may be provided in the firmware 80 of the wheel system 50 in different embodiments.

If the user does not engage the override, the following events cause state changes. During initial plug in and power up of the wheel's firmware 80, the wheel enters the single-turn, legacy mode state (state 1 in FIG. 5). If the multi-turn aware driver 56 on the host system 54 determines that the wheel 52 is a multi-turn capable wheel, it will send a command causing the wheel to switch to the native mode assuming that the game 58 is designed for the native mode (i.e., a multi-turn capable wheel). The wheel transitions from the single-turn, legacy mode state to the single-turn, native mode state by disconnecting the reconnecting as a native wheel rather than a legacy wheel. The multi-turn capable wheel is still in single-turn mode, but has additional resolution and controls (state 3 in FIG. 5).

A game 58 that is using the multi-turn aware driver 56 determines whether the wheel 52 is multi-turn capable. The multi-turn wheel desirably is convertible from multi-turn to single-turn by using a single-turn lock or stop 70. An example of such a wheel is found in co-pending U.S. patent application Ser. No. 10/434,763 now U.S. Pat. No. 7,086,949. If the wheel is multi-turn capable, depending on the game design and/or user choice, the game 58 tells the multi-turn aware driver 56 to go into the single-turn mode or the multi-turn mode. This causes the multi-turn aware driver 56 to send a command to the wheel system 50 to transition between the single-turn, native mode state (state 3 in FIG. 5) and the multi-turn, native mode state (state 4 in FIG. 5). As a result, the wheel system 50 engages or disengages the single-turn lock 70 or, in the case of a manual switch, indicates that the user should change the lock's position manually.

When the wheel system 50 is unplugged from the host system 54 and replugged into the host system typically by a USB connection 60, or goes through a reset (e.g., a USB reset), it will go back to initialize/power up and restart the whole process. The wheel system 50 maintains its calibration values across USB resets, but needs to find them again when physically unplugged and replugged onto the USB port.

Figure 5:
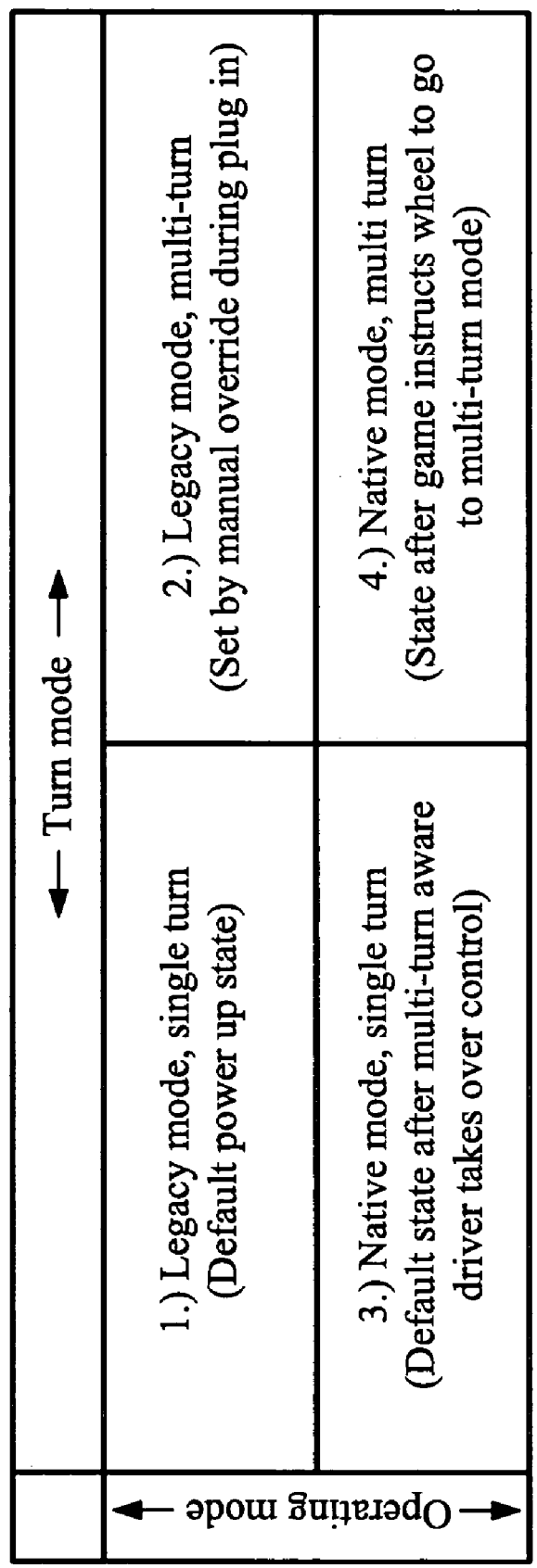
FIG. 5 is a matrix illustrating four different states of operation of the multi-turn steering wheel according to an embodiment of the present invention.

As discussed above, a manual override can be provided by the manual override module 82 to allow the use of multi-turn mode in a legacy game (state 2 in FIG. 5). During start up, the user presses a sequence of buttons on the wheel 52 to instruct the wheel system 50 to go into the multi-turn mode. The wheel system 50 still powers up as a single-turn wheel as discussed above, but upon completion of initialization converts to multi-turn mode. Neither the game nor the host system 54 sees a multi-turn wheel, since the wheel appears to them to be a single-turn wheel. In a different embodiment, the manual override module 82 can be activated at any time during the game play to give to user the flexibility to override the game's setting if the user decides to do so.

The position of the single-turn stop 70 is reported to the software/firmware of the wheel by electromechanical sensors or detectors. They may include, for example, locations sensor switches, or the "end stop to end stop" reporting of the steering wheel's rotational sensor.

B. Wheel Control System and Method

Referring to FIG. 6 for the start-up procedure, DC power is supplied to the wheel system 50 by plugging the AC adaptor 76 into an AC power source. This provides power to the various motors in the wheel system 50. The USB plug 60 is inserted into the USB port of the host 54, which may be a gaming console, a PC, or the like. The USB connection provides power for the electronic components of the wheel system 50. When the wheel system 50 first starts up, the microprocessor 62 on board the wheel system 50 comes to run and will check to see if the wheel system 50 is in single-turn mode indicated by the single-turn stop 70 in the single-turn position 71 or in multi-turn mode indicated by the single-turn stop 70 in the multi-turn position 72. The wheel 52 will begin rotating clockwise until the centering sensor 64 registers a "center" per rotation or until the centering sensor 64 hits a mechanical stop, as seen in FIG. 7. Then the wheel 52 will begin rotating counter-clockwise, as seen in FIG. 8, until the centering sensor 64 sees a mechanical stop or the total number of "centers" detected is one per rotation. As shown in FIG. 9, a multi-turn wheel has three angular centers. The first center 90 is the true center where the wheel 52 can turn through the same angle in the clockwise direction as it can in the counter-clockwise direction. The second center 92 in the counter-clockwise direction is registered if the wheel 52 rotates from the first center 90 counter-clockwise by at least 360°. The third center 94 in the clockwise direction is registered if the wheel 52 rotates from the first center 90 clockwise by at least 360°. If the wheel 52 start rotating in the clockwise direction from its most counter-clockwise position 100 in FIG. 10, it will encounter a center 102 at less than one revolution, a true center 104 after 360°, and another center 106 after another 360°, and will stop when it it's a mechanical stop in the most clockwise position 108. By keeping track of the number of centers it passes, the centering sensor 64 knows the middle center is the true rotational center of the wheel 52. This centering procedure may be performed with the centering module 84 shown in FIG. 6.

Figure 11:
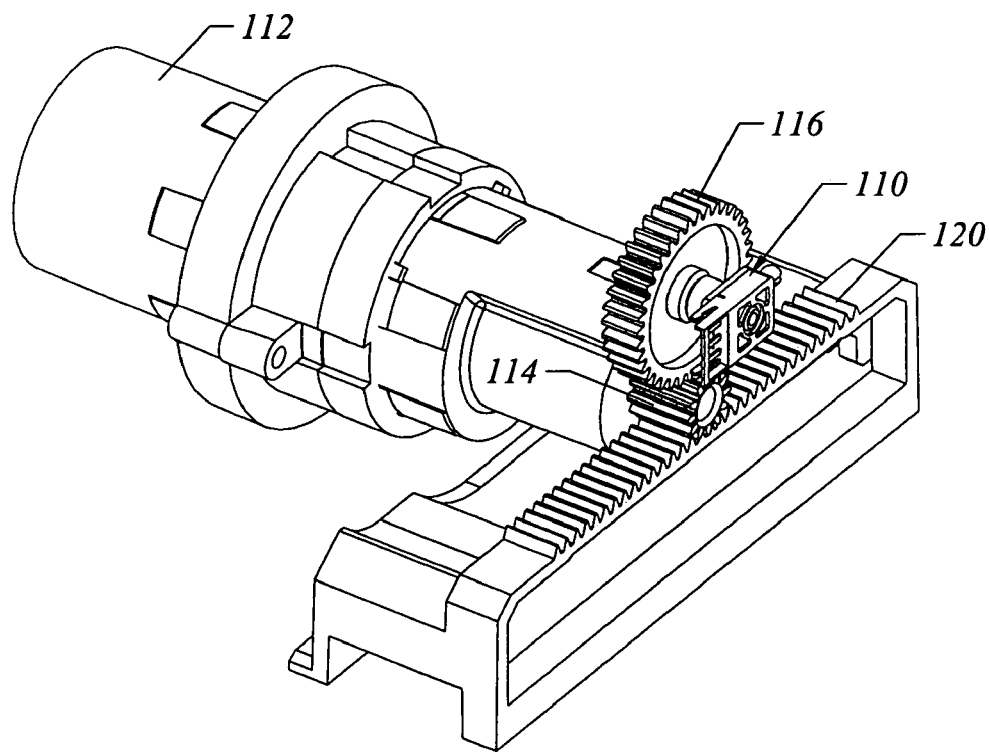
FIG. 11 is a perspective view of a potentiometer based centering system according to another embodiment of the invention.

In another embodiment as illustrated in FIG. 11, a geared down potentiometer 110 replaces the centered position encoder 64 of FIG. 6. The main shaft 112 is attached to the steering wheel, and has a pinion gear 114 which is coupled with a reduction gear 116. The potentiometer 110 is attached to the reduction gear 116. The gear ratio between the reduction gear 116 and the pinion gear 114 is selected such that the multi turns of the wheel will cause less than one turn of the potentiometer 110. This results in the potentiometer 110 providing constant, and unique position information without the requirement of moving the wheel. The gear ratio is greater than 3, and is typically about 4. FIG. 11 also shows a sliding gear rack 120 which is used to provide multi-turn stops in both counterclockwise and clockwise directions, as described in the above-referenced U.S. patent application Ser. No. 10/434,763 now U.S. Pat. No. 7,086,949. On start up the processor 62 checks the position of the potentiometer 110 by reading its electrical input. The value of the input tells the processor 62 where the wheel is currently positioned and in what mode the wheel is. The processor 62 then causes the wheel to rotate in the direction of the center until the output value from the potentiometer 110 is equal to its center position. If the wheel was in multi-turn mode the processor 62 causes the single turn stop to move into single turn position. Once the single turn stop is engaged, then the wheel calibrates itself by rotating from stop to stop. The rotational encoder 66 then determines the exact center and rotates the wheel to its centered position. During game play the output value of the potentiometer is used to maintain the true center of the wheel by comparing its value to the stored calibrated value determined during start up. The advantage of this approach is that fewer rotations of the wheel are required during start up, and the potentiometer value of the "center" is recalibrated upon each startup automatically adjusting for wear on the potentiometer and its gear train.

The geared down potentiometer 110 can also be used in addition to a centered position encoder 64. In such an embodiment, the potentiometer 110 is used only upon startup and mode change to determine the current position of the wheel. In another embodiment the geared down potentiometer could replace both the centered position encoder 64 and the rotational encoder 66. The output from the potentiometer 110 is a function of the wheel's position. Therefore the output is not dependent on finding the end stops and dividing by two to find the true (middle) center of the wheel's rotation. The position information of the wheel as indicated by the potentiometer 110 is typically stored in the wheel's firmware.

Figure 12:
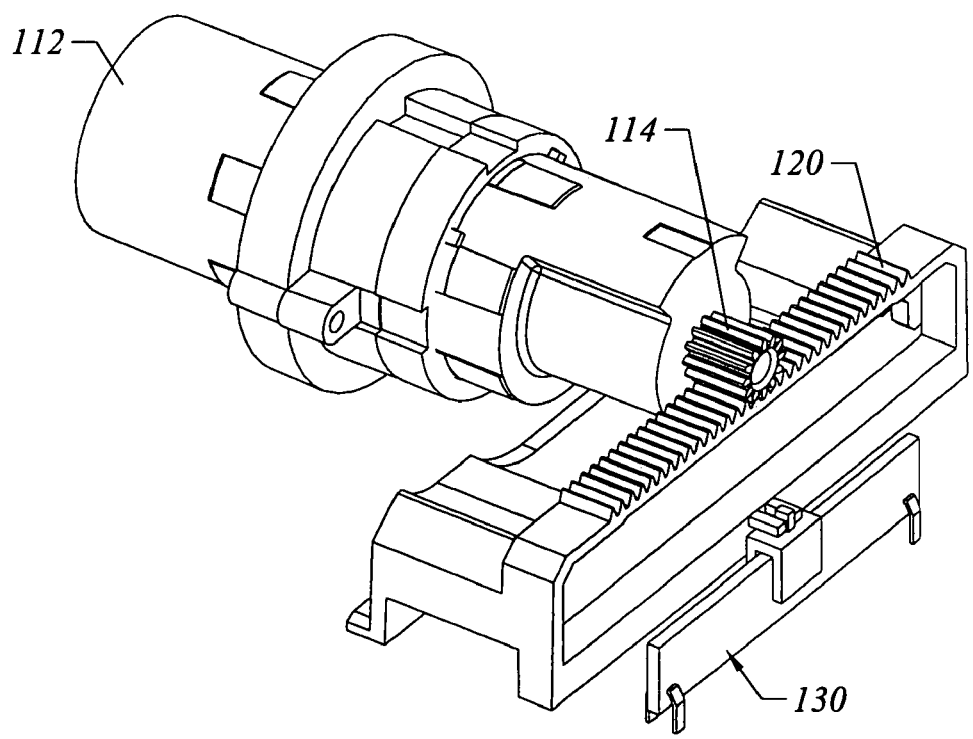
FIG. 12 is a perspective view of a linear potentiometer based multi-turn wheel according to another embodiment of the invention.

The geared down potentiometer is not limited to rotational style potentiometers. A geared down linear potentiometer 130, as shown in FIG. 12, provides the same output and control in a different configuration. The linear potentiometer 130 is attached to the sliding gear rack 120.

If the current mode cannot be determined for any reason (e.g., due to problems with the single-turn stop's physical location caused by shock or handling while un-powered), the single-turn stop 70 will be automatically put into multi-turn position.

If the wheel 52 is prevented from rotating in either the counter-clockwise direction or the clockwise direction before enough centers have been detected, it will then pause and wait for a short period of time. This pause assumes that the wheel 52 is being prevent from rotating by the user or something in its environment. After the brief pause, the wheel 52 will resume rotation in the original counter-clockwise or clockwise direction. This will be repeated indefinitely until all the centers have been detected.

Once all the centers have been detected, the wheel system 50 determines which of those centers marks the single-turn mode change. If three centers are detected, then the middle one represents the wheel's actual rotational center. The wheel 52 moves to that center position and stops. If the wheel has been powered down in multi-turn mode, it will then engage the single-turn mode, as it is configured to do during every start-up. The start-up may be performed with the start-up module 83 of FIG. 6. If the wheel system 50 has not successfully changed to the single-turn mode for any reason, it will restart the multi-turn start-up sequence.

After the wheel system 50 has successfully changed into the single-turn mode, or started up in the single-turn mode after being powered down in the single-turn mode, the wheel 52 will rotate clockwise until it hits a stop. It will then rotate counter-clockwise until it hits a stop. The range between the two stops is checked. If the wheel 52 was restrained from rotating, either by the user or something in its environment, then the range will not be consistent with the expected range, resulting in an invalid calibration. If the calibration is determined to be invalid, then the wheel 52 will wait a short period of time and will again rotate clockwise and counter-clockwise. This process is repeated until the expected range is reached, yielding a valid calibration.

As the wheel 52 rotates in the clockwise direction, it measures the edges of the centering sensor 64 and stores the data. A multi-turn gaming steering wheel uses a relative positioning system (rotational encoder 66) and a second sensor system as a confirmation of position. A relative positioning system is one where the rotation and direction are detected, but the actual position of the wheel 52 is not. The second sensor system is in the form of a center sensor that detects if the steering wheel 52 is at the 12 O'clock (centered) position. The second sensor system also serves the purpose of correcting the primary sensor system if the data is lost. Data, in the form of "counts" from the encoding system, can be lost if the angular velocity of the wheel is very high, or reversals of rotation occur very quickly. This results in a skewed wheel center position. When the wheel is first in the single-turn mode, it will rotate end-to-end to determine where the mechanical ends are and will store information regarding the sensor as it passes through the ends. During use, the wheel system 50 will check location against the stored correct location every time it detects the center sensor. If there is a significant discrepancy between what it expects the value to be and what the detected value is, then it will slowly adjust data so that the detected value becomes closer to the true value, which is the one stored during calibration.

During start-up, if the wheel system 50 has been powered down from the previous session with the single-turn stop engaged, the wheel system 50 remains in the single-turn, legacy mode state. If the wheel system 50 has been in the multi-turn, native mode state when powered down from the previous session, the single-turn stop is engaged at this time to put the wheel system 50 in the single-turn, legacy mode state. In this embodiment, the wheel system 50 always initializes or powers up in the legacy mode.

At this time the wheel system 50 announces itself to the host 54. The host 54 then retrieves the device descriptor 88 from the wheel system 50. The device descriptor identifies the wheel as a specific wheel, such as the Logitech legacy wheel Driving Force™. The term Driving Force™ as used in this context refers to Logitech's standard FFB gaming steering wheel. The device descriptor of multi-turn wheel will appear exactly as a Driving Force™ wheel with the same report format. The only difference will be the firmware revision (bcdDevice field). If the host 54 is not aware of this particular multi-turn wheel, it will continue to communicate with the device just as it would with a legacy wheel Driving Force™. This means that the host 54 will accept all of the Driving Force™ commands and will read positional data from the wheel in the same format as the original Driving Force™ wheel. This approach guarantees maximum compatibility with all previous gaming titles.

If the host 54 is aware of the multi-turn wheel, identifiable by looking at the VendorID/ProductID/bcdDevice fields in the device descriptor, the host 54 will let the wheel system

50 know by sending the wheel system 50 a command to go to its native mode. The native mode in this context means the way the wheel 52 would behave if there were no constraints for compatibility. This native mode, as opposed to the legacy mode, reports the wheel axis with a higher resolution to take advantage of the extended resolution requirements and capabilities of the wheel's sensing mechanism. In the legacy mode, the wheel's position is reported with relatively low resolution. In the native mode, the wheel's position is reported in much higher resolution than that in the legacy mode. When the wheel system 50 receives the command from the host 54 to go to the native mode, the wheel system 50 will disconnect from the host 54, and then reconnect with a different device descriptor and different report descriptor. This is the desirable way to change a wheel's fundamental behavior without having the user disconnect and re-connect it to the host.

On the host 54, after sending the command to the wheel system 50 to go to the native mode, the wheel system 50 is seen to disappear and then reappear with different descriptors and capabilities. As mentioned before, the wheel's resolution is enhanced and additional functionality is exposed, allowing the multi-turn aware driver 56 to change its scaling of the input values to take advantage of the higher range, so the input looks the same to the host 54 regardless of the multi-turn state in which the wheel system 50 is. The wheel system 50, however, is still in single-turn mode. The multi-turn aware driver 56 on the host 54, however, offers the possibility for the game 58 to switch the wheel system 50 into the multi-turn mode. The reasoning behind this is that games that are not written for multi-turn wheel capabilities will get what they expect or assume, i.e., a single-turn wheel like the previous wheels in use. Games that can take advantage of multi-turn mode will be written to handle the difference in the input section as well, and ideally give the user a choice between multi- and single-turn. Whatever the user's (or game's) choice may be, it tells the driver to switch the wheel into either the multi-turn mode or the single turn mode.

Upon reception of the game's intention, the multi-turn aware driver 56 will then send a command to the wheel system 50 to switch its mode to the desired state. The wheel system's firmware, upon receiving the command, will do what is necessary to physically actuate the single-turn stop to move it into the single-turn mode or multi-turn mode, as requested by the multi-turn aware driver 56. This may involve several steps, such as waiting for the wheel 52 to be rotated to the center position.

C. Soft Stop for Wheel

The desire for realism of a multi turn wheel resulted in the invention of a realistic "soft stop" feature. Gaming wheels typically use hard rubber/urethane pads to bring the wheel to a stop. This is done to prevent calibration issues from occurring due to variations in total "stop to stop" travel of the wheel; if the user were to forcefully push the wheel in the clockwise direction deforming the stop beyond its normal compression, the total "counts" would change causing the wheel to skew in the direction of the added travel. Hard stops also should be stiff and strong to accept the forces generated at the end of a steering wheel rotation thereby increasing the cost of the product. The addition of soft stops cause the force generated by the de-acceleration associated with the wheel stopping rapidly to be spread out over a longer amount of rotation/time. While the energy dissipated is the same, the time over which it is dissipated is increased reducing the force spike of the stop. This is similar to what happens with automobile airbags; they act to reduce the force spike by spreading the de-acceleration over a longer period of time. This is accomplished by sending the FFB motor a "spring" commands during the last few degrees of wheel rotation that rapidly increases in "strength" as the hard stop approaches. In this way some of the energy of the stop is dissipated in the gear set and the motor windings. The result is a softer, more car-like slowing and stopping of the steering wheel. This approach does not affect the calibration because the total rotational travel is the same. The soft stop is applied in the normal range of the mechanism therefore eliminating variations in total counts brought on by mechanical deformation of the stops. In another embodiment, the FFB transmission is designed to generate much greater forces than are required for game play. This can be accomplished with a higher gear ratio, or a stronger motor. The ability of the FFB transmission to generate much higher forces allows the elimination of mechanical "hard stops" entirely. A very strong spring force is sent to the FFB motor at the point in the wheels rotation at which it is desired for the wheel to stop. This very strong spring would prevent the wheel from being turned any further in that direction. This approach to rotation angle control would allow for an infinite number of angles through which the wheel could be rotated. The firmware/software could tell the wheel to set the stops at 200 degrees of total rotation for one style of game, 470 degrees for another, 900 degrees for another, or no stops if infinite rotation angles are desired (arcade style racing wheels are generally designed this way). FFB generated stops would simplify the mechanism design and improve reliability while providing an infinite range of rotations that could be individually configured to each user's requirements.

D. Force Feedback for Wheel

The force feedback system implementation for a multi turn wheel has certain distinctive features. One feature is the "loose wheel" feature. When no forces are engaged, the force feedback driver in the wheel system 50 allows the wheel 52 to move at relatively high speeds. Previously used motor drivers partially shunted the motor when no forces were engaged. This created a heavy feeling within the wheel when trying to move it. This wheel system 50 removes that feeling of a heavy wheel. This loose wheel feeling results because the motor shunting is not being engaged when there are no forces playing.

Another feature of the force feedback implementation is for multi-turn use of the wheel 52. Force feedback in general utilizes both position-based forces (springs and dampers), and non-position-based forces. The position-based forces can be handled differently based on single-turn or multi-turn mode. In both cases the forces are received in the same format through the USB connection with the gaming host 54. Since in the multi-turn mode the range of position is much larger than the range of position in the single turn mode, it is undesirable to have the forces apply to only one revolution of the wheel 52. For this reason the position-based forces in the multi-turn mode can be applied to the entire range of the wheel rotation. Due to the large difference in rotational ranges between the single-turn mode and the multi-turn mode, there are other tasks that may need to be performed, such as different processing for the position-based force feedback effects as springs and dampers. These changes are more or less heuristic. For example, for a given damper coefficient, a user expects a certain "resistance". The damper effect calculates a force as a scale of the velocity, $F=k*v$. The velocity is calculated based on the differences of the positions between two firmware loops. With the same range, but physically a much larger range of motion, the scaling of the output may need be adjusted to "feel right". The same holds for springs.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A multi-turn gaming wheel system comprising:
    a steering wheel rotatable from a centered position in a counter-clockwise direction for over 180° and in a clockwise direction for over 180° to provide more than 360° lock-to-lock;
    a single-turn stop movable between a single-turn mode position and a multi-turn mode position, the single-turn stop limiting the steering wheel to rotation from the centered position of at most 180° in the counter-clockwise direction and at most 180° in the clockwise direction to provide at most 360° lock-to-lock in the single-turn mode, the single-turn stop not limiting the steering wheel in rotation in the multi-turn mode position; and
    an operating mode module configured to communicate with a host system and to set an operating mode for the steering wheel to be in a legacy mode to provide input to the host system for playing a legacy game designed for a single-turn wheel capable of at most 360° lock-to-lock, or in a native mode to provide input to the host system for playing a native game designed for a multi-turn wheel capable of more than 360° lock-to-lock.

2. The multi-turn gaming wheel system of claim 1 further comprising a start-up module configured to select the single-turn mode and the legacy mode during start-up of the multi-turn gaming wheel system.

3. The multi-turn gaming wheel system of claim 2 further comprising a manual override module operable by a user manually to select between the single-turn mode and the multi-turn mode for the steering wheel.

4. The multi-turn gaming wheel system of claim 3 wherein the single-turn stop is in the single-turn mode position upon start-up, and is moved to the multi-turn mode position upon selection of the multi-turn mode of the manual override module.

5. The multi-turn gaming wheel system of claim 1 further comprising a manual override module operable by a user manually to select between the single-turn mode and the multi-turn mode for the steering wheel, wherein the single-turn stop is moved to the single-turn mode position upon selection of the single-turn mode of the manual override module and to the multi-turn mode position upon selection of the multi-turn mode of the manual override module.

6. The multi-turn gaming wheel system of claim 1 further comprising a centering module configured to count a number of angular centers of the steering wheel lock-to-lock and determine a center position of the steering wheel, wherein each angular center represents a revolution of rotation of the steering wheel.

7. The multi-turn gaming wheel system of claim 6 further comprising a center position encoder configured to detect and register a center for the steering wheel for each revolution of rotation of the steering wheel.

8. The multi-turn gaming wheel system of claim 1 further comprising a rotational encoder configured to detect a rotation and a direction of rotation of the steering wheel.

9. The multi-turn gaming wheel system of claim 1 wherein the steering wheel is rotatable from the centered position in the counter-clockwise direction for about 450° and in the clockwise direction for about 450°.

10. The multi-turn gaming wheel system of claim 1 further comprising a sensor operatively coupled with the steering wheel to detect a rotational position of the steering wheel with respect of the centered position.

11. The multi-turn gaming wheel system of claim 10 wherein the sensor coupled with the steering wheel by a gear reduction system to rotate by less than 360°.

12. The multi-turn gaming wheel system of claim 10 wherein the sensor comprises a rotational potentiometer or a linear potentiometer operatively coupled with the steering wheel.

13. A system for playing a game using a steering wheel, the system comprising:
    a gaming wheel system including:
        a steering wheel rotatable from a centered position in a counter-clockwise direction and in a clockwise direction to provide a rotational range lock-to-lock;
        a memory comprising a wheel identifier in a first location identifying the steering wheel as a single-turn wheel or a multiple turn wheel, the single-turn wheel being rotatable from the centered position of at most 180° in the counter-clockwise direction and at most 180° in the clockwise direction to provide at most 360° lock-to-lock, the multi-turn wheel rotatable from the centered position in a counter-clockwise direction for over 180° and in a clockwise direction for over 180° to provide more than 360° lock-to-lock; and
    a host system including a multi-turn aware driver configured to communicate with the gaming wheel system to receive the wheel identifier identifying the steering wheel and to set the steering wheel to operate in the single-turn mode or the multi-turn mode, wherein the single-turn stop is moved to the single-turn mode position upon setting the steering wheel in the single-turn mode and to the multi-turn mode position upon setting the steering wheel in the multi-turn mode.

14. The system of claim 13 wherein the gaming wheel system further comprises a start-up module configured to select the single-turn mode and the legacy mode during start-up of the multi-turn gaming wheel system.

15. The system of claim 14 wherein the gaming wheel system is in the single-turn mode upon start-up, and is transitioned to the multi-turn mode upon receiving communication from the multi-turn aware driver of the host system to set the steering wheel in the multi-turn mode.

16. The system of claim 13 the host system is configured to play a game which is either a legacy game designed for a single-turn wheel capable of at most 360° lock-to-lock, or a native game designed for a multi-turn wheel capable of more than 360° lock-to-lock.

17. The system of claim 16 wherein the host system communicates with the gaming wheel system to leave the steering wheel to operate in a legacy mode if the game is a legacy game or set a native mode if the game is a native game.

18. The system of claim 13 wherein the gaming wheel system further comprises a manual override module operable by a user manually to select between the single-turn mode and the multi-turn mode if the steering wheel is a multi-turn wheel, wherein the single-turn stop is moved to the single-turn mode position upon selection of the single-turn mode of the manual override module and to the multi-turn mode position upon selection of the multi-turn mode of the manual override module.

19. The system of claim 13 wherein the memory of the gaming wheel system includes a device descriptor in a second location describing features of the gaming wheel system, and wherein the host system is configured to communicate with the gaming wheel system to receive the device descriptor and sets up game play conditions based on the device descriptor.

20. A method of operating a gaming steering wheel, the method comprising:
   providing a gaming wheel system which includes:
      a steering wheel rotatable from a centered position in a counter-clockwise direction and in a clockwise direction to provide a rotational range lock-to-lock;
      a memory comprising a wheel identifier in a first location identifying the steering wheel as a single-turn wheel or a multiple turn wheel, the single-turn wheel being rotatable from the centered position of at most 180° in the counter-clockwise direction and at most 180° in the clockwise direction to provide at most 360° lock-to-lock, the multi-turn wheel rotatable from the centered position in a counter-clockwise direction for over 180° and in a clockwise direction for over 180° to provide more than 360° lock-to-lock;
   rotating the steering wheel in a counter-clockwise direction or a clockwise direction and counting a number of revolutions with each revolution indicating passing a center, until the steering wheel hits a stop or until the number of centers matches a preset maximum number, and if the steering wheel hits the stop before the number of centers matches the preset maximum number then rotating the steering wheel in an opposite direction and counting a number of revolutions until the steering wheel hits a stop or until the number of centers matches the preset maximum number, wherein the steering wheel is a single-turn wheel if the number of centers equals to one and the steering wheel is a multi-turn wheel if the number of centers equals to more than one;
   setting the steering wheel system in a single-turn mode during start-up.

21. The method of claim 20 further comprising changing the steering wheel system from the single-turn mode to the multi-turn mode after start-up if the number of centers is greater than one.

22. The method of claim 20 further comprising permitting a user to manually override by setting the steering wheel system to the single-turn mode or the multi-turn mode if the number of centers is greater than one.

23. The method of claim 20 wherein setting the steering wheel system in the single-turn mode if the number of centers is greater than one comprises limiting the steering wheel to rotation from the centered position of at most 180° in the counter-clockwise direction and at most 180° in the clockwise direction to provide at most 360° lock-to-lock in the single-turn mode.

24. The method of claim 20 further comprising setting an operating mode of the gaming wheel system during start-up to a legacy mode to provide input to a host system for playing a legacy game designed for a single-turn wheel capable of at most 360° lock-to-lock.

25. The method of claim 24 further comprising changing the operating mode of the gaming wheel system after start-up to a native mode to provide input to the host system for playing a native game designed for a multi-turn wheel capable of more than 360° lock-to-lock.

26. The method of claim 25 wherein the operating mode is changed by communicating a command from the host system to the gaming wheel system for playing the native game.

27. The method of claim 20 further comprising reading a device descriptor from the gaming wheel system describing features of the gaming wheel system, and setting up game play conditions on the host system based on the device descriptor.

* * * * *